(12) United States Patent
Song et al.

(10) Patent No.: US 10,808,067 B2
(45) Date of Patent: Oct. 20, 2020

(54) POLYOXYMETHYLENE RESIN COMPOSITION AND MOLDED ARTICLE MANUFACTURED WITH THE SAME

(71) Applicants: Hyundai Motor Company, Seoul (KR); Kia Motors Corporation, Seoul (KR)

(72) Inventors: Joon Yong Song, Gyeonggi-do (KR); Shin Tae Bae, Gyeonggi-do (KR); KieYoun Jeong, Gyeonggi-do (KR); Soon Young Cha, Ulsan (KR); Hong Won Chae, Seoul (KR); Hyeon Cheol Kim, Busan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 93 days.

(21) Appl. No.: 16/178,121

(22) Filed: Nov. 1, 2018

(65) Prior Publication Data

US 2019/0161572 A1 May 30, 2019

(30) Foreign Application Priority Data

Nov. 30, 2017 (KR) .................. 10-2017-0162864

(51) Int. Cl.
| | | |
|---|---|---|
| *C08G 2/10* | (2006.01) | |
| *C08K 3/40* | (2006.01) | |
| *C08K 13/02* | (2006.01) | |
| *C08K 7/14* | (2006.01) | |
| *C08K 5/16* | (2006.01) | |
| *C08K 7/06* | (2006.01) | |
| *C08K 5/3445* | (2006.01) | |
| *C08K 5/24* | (2006.01) | |
| *C08K 5/3492* | (2006.01) | |

(52) U.S. Cl.
CPC .................. *C08G 2/10* (2013.01); *C08K 3/40* (2013.01); *C08K 5/16* (2013.01); *C08K 7/06* (2013.01); *C08K 7/14* (2013.01); *C08K 13/02* (2013.01); *C08K 5/24* (2013.01); *C08K 5/3445* (2013.01); *C08K 5/34922* (2013.01); *C08K 2201/004* (2013.01)

(58) Field of Classification Search
CPC ... C08G 2/10; C08K 3/40; C08K 5/16; C08K 7/06; C08K 7/14; C08K 13/02
See application file for complete search history.

(56) References Cited

U.S. PATENT DOCUMENTS

2014/0239760 A1 * 8/2014 Asai .................. H02K 7/116
                                                              310/83

FOREIGN PATENT DOCUMENTS

| JP | 2004-522810 A | 7/2004 | |
|---|---|---|---|
| JP | 2014-533770 A | 12/2014 | |
| KR | 10-0574165 A | 4/2006 | |
| KR | 10-2013-0141526 A | 12/2013 | |
| WO | WO-2010025446 A1 * | 3/2010 | .............. C08L 59/00 |

\* cited by examiner

*Primary Examiner* — John E Uselding
(74) *Attorney, Agent, or Firm* — Mintz Levin Cohn Ferris Glovsky and Popeo, P.C.; Peter F. Corless

(57) ABSTRACT

Disclosed is a polyoxymethylene resin composition that includes a filler in an amount of about 5 to 30 wt %, a formaldehyde reducing agent in an amount of about 0.01 to 1 wt %, and a polyoxymethylene resin constituting the remaining balance of the polyoxymethylene resin composition, all the wt % based on the total weight of the polyoxymethylene resin composition. In particular, per 1 g of the polyoxymethylene resin may include an amount of 30 to 40 μmol of formate at terminal ends of the polyoxymethylene resin.

13 Claims, No Drawings

POLYOXYMETHYLENE RESIN COMPOSITION AND MOLDED ARTICLE MANUFACTURED WITH THE SAME

CROSS-REFERENCE TO RELATED APPLICATION

This application claims priority to and the benefit of Korean Patent Application No. 10-2017-0162864 filed in the Korean Intellectual Property Office on Nov. 30, 2017, the entire contents of which are incorporated herein by reference.

TECHNICAL FIELD

The present invention relates to a polyoxymethylene resin composition and a molded article manufactured with the same. The polyoxymethylene resin composition may provide excellent thermal stability and mechanical strength.

BACKGROUND

In the global vehicle market, metal materials used for fuel-related parts of vehicles have been replaced by plastics due to continuous demands for weight reduction and integration of parts, and requirements for the properties of the applied plastics have been increasingly strict.

Vehicle-related parts can be made of polyoxymethylene (hereinafter referred to as "POM"), polyamide 6, polyamide 12, polybutylene terephthalate, polyphenylene sulfide, and high density polyethylene depending on their driving conditions.

The polyoxymethylene is a crystalline resin having excellent in mechanical properties, creep resistance, fatigue resistance, abrasion resistance, and chemical resistance, and has been widely used for parts requiring complex properties such as various electrical and electronic products, vehicle parts, and other machine mechanisms.

On the other hand, a vehicle is generally equipped with a heating, ventilating, and air conditioning (HVAC) system that may control air by introducing outdoor air into a vehicle interior or recirculating the introduced air to heat or cool it. For example, an actuator of the HVAC is a part that adjusts an angle of a flap in the HVAC to change a temperature and a wind direction in the vehicle and to change indoor air to outdoor air or vice versa. The actuator has a structure in which a plurality of gears are engaged and operated.

Since a plastic part for an output gear of the actuator is exposed indoors, its mechanical strength should be good, and formaldehyde generation therefrom should be small. However, although a filler is added to a POM resin thereof so that it has satisfactory mechanical strength, the filler may increase a frictional stress of the POM resin during a molding process thereof to increase an amount of heat generated, and the POM resin may be decomposed by heat to increase an amount of generated formaldehyde.

Accordingly, in the related arts, melamine and hydrazine-based formaldehyde reducing agents have been used. However, the melamine-based formaldehyde reducing agent does not provide sufficient function, and although the hydrazine-based reducing agent has an excellent formaldehyde reducing function, it may interfere with reaction between the POM and the filler, thereby deteriorating the mechanical strength.

The above information disclosed in this Background section is only for enhancement of understanding of the background of the invention and therefore it may contain information that does not form the prior art that is already known in this country to a person of ordinary skill in the art.

SUMMARY OF THE INVENTION

In preferred aspects, the present invention provides a polyoxymethylene resin composition and a molded article manufactured with the same.

In one aspect, provided is the polyoxymethylene resin composition that may reduce generation of formaldehyde and maintain mechanical strength even when it is applied to an actuator of an HVAC as manufactured in a molded article. The polyoxymethylene resin composition may include a filler in an amount of about 5 to 30 wt %, a formaldehyde reducing agent in an amount of about 0.01 to 1 wt %, and a polyoxymethylene resin constituting the remaining balance of the polyoxymethylene resin composition, all the wt % are based on the total weight of the polyoxymethylene resin composition. The polyoxymethylene resin may constitute the remaining balance of the polyoxymethylene resin composition. In particular, per 1 g of the polyoxymethylene resin may include an amount of about 30 to 40 µmol of formate. For example, the formate may be formed at terminal ends of the polyoxymethylene resin.

The filler may include at least one of a fiber type, a particle type, a plate type, and a needle type of filler.

The term "fiber type" as used herein refers to a shape having a length that is at least 1,000 times, at least 10,000 times, or at least 100,00 times greater than a width or diameter of an object, without particularly limiting length of the object. For example, the preferred fiber type may have a length of about 100 µm to 10 mm, of about 500 µm to 10 mm, or of about 1 mm to 10 mm. The term "particle type" as used herein refers to a shape having a substantially similar dimensions in length and width (or diameter), and having a shape of sphere, or similar to a sphere. The term "plate type" as used herein refers to a shape having a planar surface that is at least 100 times, at least 1,000 times, at least 10,000 times, or at least 100,00 times greater than a thickness of an object, without particularly limiting the surface area thereof (e.g., shape). The term "needle type" as used herein refers to a shape having a length that is at least 20 times, at least 50 times, or at least 100 times greater than a width or diameter of an object, without particularly limiting length of the object.

The filler may suitably include a fiber type of filler having an average length of about 2.5 to 4.5 mm.

The filler may include at least one of an inorganic fiber and an organic fiber.

The filler may suitably include a glass fiber.

The reducing agent may be included in an amount of about 0.05 to 0.3% by weight, based on the total weight of the polyoxymethylene resin composition.

The reducing agent may include at least one of urea, melamine, and hydrazine, which may be optionally substituted.

An average molecular weight of the reducing agent may be in a range of about 100 to 200 g/mol.

The reducing agent may include at least one of urea substituted with an imidazole group and urea substituted with a diazo group.

The reducing agent may include at least one of 2,5-dioxo-4-imidazolidinyl urea and diazolidinyl urea.

In another aspect, provided is a molded article that may be molded and manufactured with the polyoxymethylene resin composition as described herein.

Preferably, the molded article may be an actuator of an HVAC system.

Further provided herein is a vehicle that may include the polyoxymethylene resin composition as described herein.

Other aspects of the invention are disclosed infra.

The polyoxymethylene resin composition according to various exemplary embodiments of the present invention may allow an end portion of a POM resin to be reacted, thereby increasing force combined with a filler and reducing an amount of formaldehyde generated. As a result, mechanical strength of a molded article including the polyoxymethylene resin composition as described herein may be improved, and an amount of formaldehyde generated may be reduced when the molded article is applied to an actuator of an HVAC.

DETAILED DESCRIPTION OF THE EMBODIMENTS

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Provided herein is a polyoxymethylene (POM) resin composition (the "composition"). In one preferred aspect, the composition according to an exemplary embodiment of the present invention may include a polyoxymethylene resin, a filler, and a formaldehyde reducing agent.

Hereinafter, each component element will be described in detail.

The polyoxymethylene resin of the present invention may be a homopolymer of oxymethylene monomers represented by Chemical Formula 1, or a copolymer in which a monomer of Chemical Formula 1 and a monomer of Chemical Formula 2 are randomly bonded.

  [Chemical Formula 1]

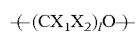  [Chemical Formula 2]

In Chemical Formula 2, $X_1$ and $X_2$ may be each independently selected from hydrogen, an alkyl group, and an aryl group. l may be an integer of 1 to 6.

In an exemplary embodiment, both $X_1$ and $X_2$ may not be hydrogen. Preferably, l may be an integer of 2 to 6.

The oxymethylene homopolymer may be prepared by polymerizing formaldehyde or cyclic oligomers thereof (e.g., trioxane). The oxymethylene copolymer in which the monomer represented by Chemical Formula 1 and the monomer represented by Chemical Formula 2 are bonded may be prepared by randomly copolymerizing formaldehyde or a cyclic oligomer thereof (e.g., trioxane), and a cyclic ether represented by Chemical Formula 3 or a cyclic formal represented by Chemical Formula 4.

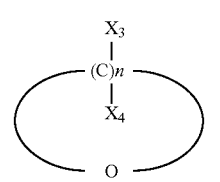  [Chemical Formula 3]

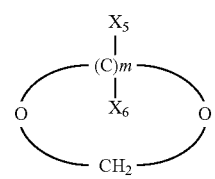  [Chemical Formula 4]

In Chemical Formulas 3 and 4, $X_3$, $X_4$, $X_5$, and $X_6$ may be the same as or different from each other, which may be selected from hydrogen and an alkyl group (e.g., substituted or unsubstituted $C_1$-$C_{20}$ alkyl, substituted or unsubstituted $C_1$-$C_{12}$ alkyl, substituted or unsubstituted $C_1$-$C_6$ alkyl, or substituted or unsubstituted $C_1$-$C_4$ alkyl). $X_3$, $X_4$, $X_5$, and $X_6$ may be bonded to the same carbon atom or to another carbon atom, and n and m may be an integer of 2 to 6, respectively.

When the copolymerized monomer is used in the random copolymerization, the cyclic ether may be ethylene oxide, propylene oxide, butylene oxide, phenylene oxide, or the like, and the cyclic formate may be 1,3-dioxolane, diethylene glycol formal, 1,3-propanediol formal, 1,4-butanediol formate, 1,3-dioxepanformate, 1,3,6-trioxocane, and the like. In an exemplary embodiment, one or more monomers selected from monomers such as ethylene oxide, 1,3-dioxolane, and 1,4-butanediol formal may be used as a main monomer, and by adding these monomers to trioxane or formaldehyde corresponding to the main monomer. In an exemplary embodiment, in the randomly copolymerization may occur using a Lewis acid as a catalyst. In an exemplary embodiment, an oxymethylene copolymer having a melting point of about 150° C. or greater and having two or more bonding carbon atoms in a main chain may be formed.

In the oxymethylene copolymer, a ratio of the oxymethylene bonded structure to a repeated unit of oxymethylene may be in a range of about 0.05 to 50 moles, preferably about 0.1 to 20 moles.

In an exemplary embodiment, the catalyst in the polymerization (e.g., random polymerization) of the oxymethylene polymer may be any known anionic catalyst or cationic catalyst. Examples of the polymerization catalyst for trioxane may include, but not be limited to, a halogen such as chlorine, bromine, and iodine; organic and inorganic acids such as alkyl or allylsulfonic acid, $HClO_4$, $HIO_4$, derivatives of $HClO_4$, $CPh_3C(IO_4)$, $R_3SiHSO_4$, and the like; metal halide compounds such as $BF_3.OH_2$, $BF_3.OEt_2$, $BF_3.OBu_2$, $BF_3.CH_3COOH$, $BF_3.PF_5.HF$, $BF_3$-10-hydroxyacetophenol, $Ph_3CSnCl_5$, $Ph_3CBF_4$, $Ph_3CS_6Cl_6$, and the like; metal esters such as carboxylate compounds of copper, zinc, cadmium, iron, cobalt, and nickel; metal oxides such as $P_2O_5+SO_2$, $P_2O_5+$ phosphoric acid esters, and the like; a catalyst in which an organic metal and a metal halide compound are combined, and the like. A coordination compound of boron trifluoride may be suitably used as the catalyst. Preferably, $BF_3.OEt_2$, and $BF_3.OBu_2$, may be used as the catalyst. The polymerization catalyst may suitably be included in a range of $2 \times 10^{-6}$ to $2 \times 10^{-2}$ mol per 1 mol of trioxane in the polymerization reaction (e.g., random polymerization).

The polymerization may be performed in a form of bulk polymerization, suspension polymerization, or solution polymerization, and a reaction temperature thereof may be in a range of about 0 to 100° C., or preferably about 20 to 80° C.

After polymerization, a deactivating agent for deactivating the residual catalyst may be added. The deactivating agent may include, but not be limited to, tertiary amines such as triethylamine, cyclic sulfur compounds such as thiophene, and phosphorus compounds such as triphenylphosphine, and these are Lewis base materials having non-covalent electron pairs. The deactivating agent may form complexes with a catalyst.

In addition, in the polymerization of polyoxymethylene, an alkyl-substituted phenol or an ether may be used as a chain transferring agent, and alkyl ethers such as dimethoxymethane may be suitably used. In the exemplary embodiment of the present invention, the polyoxymethylene may include a predetermined amount of the terminal ends of formate

(e.g., —O—C(O)H or H—C(=O)—O⁻), which may be controlled by an amount of the chain transferring agent used. For example, an amount of about 0.005 to 0.1 parts by weight of the chain transferring agent may be contained per 100 parts by weight of a monomer. When the amount of the chain transferring agent is less than the predetermined amount, e.g., less than about 0.005 parts by weight, the amount of the terminal ends of the formate may increase. In contrast, when the amount of the chain transferring agent is greater than the predetermined amount, e.g., greater than about 0.1 parts by weight of the chain transferring agent is used, the amount of the terminal ends of the formate may decrease.

In the exemplary embodiment of the present invention, the polyoxymethylene may include a predetermined amount of the terminal ends of the formate. For example, an amount of about 30 to 40 μmol of the terminal ends of the formate per 1 g of the polyoxymethylene resin may be contained. When the amount of the terminal ends of the formate is less than the predetermined amount, e.g., less than about 30 μmol, the bonding with a filler may not be properly performed, thus its mechanical strength, particularly its flexural modulus, may be deteriorated. When the amount of the terminal ends of the formate is greater than about the predetermined amount, e.g., greater than about 40 μmol, a generation amount of formaldehyde may increase. Preferably, about 33 to 37 μmol of the terminal ends of the formate per 1 g of the polyoxymethylene resin may be contained. In the present invention, the term "terminal ends" should be understood to mean all terminal ends, and if present, all side terminal end groups.

A content of the terminal ends of the formate in the polyoxymethylene resin may be measured by a generally known method without any particular limitation. For example, the content of the terminal ends of the formate may be measured by a method of preparing the polyoxymethylene resin in a form of a film, immersing it in a chloroform solution at a temperature of 100° C. for 6 hours, and then measuring an area of 1778 to 1697 $cm^{-1}$ by using FT-IR.

The polyoxymethylene resin may suitably be present. In a preferred aspect, the polyoxymethylene resin may be included as a remaining portion of the polyoxymethylene resin composition except for the filler and the formaldehyde reducing agent. That is, the polyoxymethylene resin may include a substance (e.g., at least 1 wt %, 2 wt %, 3wt % or 5wt % based on the total weight of the polyoxymethylene resin) For example, the polyoxymethylene resin may be included in an amount of about 69 to 94% by weight based on the total weight of the composition.

The filler may suitably be added to improve mechanical strength.

The filler may include at least one of a fiber type, a particle type, a plate type, and a needle type of filler.

The fiber type of filler may include at least one of an inorganic fiber and an organic fiber. The inorganic fiber may include, but not be limited to, a glass fiber, a carbon fiber, a silicon fiber, a silica alumina fiber, a zirconia fiber, a boron nitride fiber, a silicon nitride fiber, a boron fiber, a potassium titanate fiber, or a metal fiber such as stainless steel, aluminum, titanium, and copper. The organic fiber may be an aromatic polyamide resin, a fluororesin, or an acrylic resin.

The particle type of fiber may include, but not be limited to, carbon black or silicates such as silica, quartz powder, glass beads, glass powder, calcium silicate, aluminum silicate, kaolin, talc, clay, diatomaceous earth, and wollastonite; metal oxides such as iron oxide, titanium oxide, and alumina; metal sulfates such as calcium sulfate and barium sulfate; carbonates such as calcium carbonate, magnesium carbonate, and dolomite; silicon carbide; silicon nitride; boron nitride; and various metal powders.

The plate type of filler may include, but not be limited to, mica, glass flake, or various metal foils. These fillers may suitably be used alone or in combinations of two or more.

These fillers may suitably be either surface-treated or non-surface-treated, and those conventionally known as surface treatment agents may be used. For example, silane-based, titanate-based, aluminum-based, and zirconium-based coupling agents may be used.

In the exemplary embodiment of the present invention, the fiber type of filler may be used. Preferably, a fiber type of filler having an average length of about 2.5 to 4.5 mm may be used. When the average length is less than a predetermined length, e.g., less than about 2.5 mm, mechanical properties thereof may be deteriorated. When the average length is greater than a predetermined length, e.g., greater than about 4.5 mm, processability may be deteriorated, mechanical properties may not be uniformly obtained, and thermal stability of the POM may be disadvantageous. Accordingly, the fiber type of filler having the length of the above-mentioned range may be used. An average diameter of the fiber type of filler may be in a range of about 1 to 10 μm. Among the type fiber of fillers, a glass fiber may be used.

The filler may be included in the polyoxymethylene resin composition in an amount of about 5 to 30% by weight based on the total weight of the composition. When the amount of the filler is less than a predetermined amount, e.g., less than about 5 wt %, the mechanical properties of the molded article may be deteriorated. When the amount of the filler is greater than a predetermined amount, e.g., greater than about 30 wt %, dispersion among the fillers may be difficult, thus uniform characteristics thereof may not be obtained. Preferably, the filler may be included in an amount of 10 to 25% by weight.

The formaldehyde reducing agent may be added to reduce the formaldehyde generated in the molded article.

The formaldehyde may suitably include at least one of urea, melamine, and hydrazine, which may optionally include one or more substituents. For example, melamine may provide excellent reactivity between the polyoxymethylene resin and the filler, thus it may increase mechanical strength. The hydrazine may be excellent for reducing formaldehyde. The urea may provide excellent reactivity between the polyoxymethylene resin and the filler, and be excellent for reducing formaldehyde. Preferably, a compound of the urea (e.g., substituted or unsubstituted urea) may be suitably included in the composition.

For instance, urea having a substituent of ring structure may be used as the reducing agent. Preferably, the urea as used herein may be at least one of urea having an imidazole group and urea having a diazo group. Preferably, at least one of (2,5-dioxo-4-imidazolidinyl) urea and diazolidinyl urea may be included therein.

An average molecular weight of the reducing agent may be in a range of about 100 to 200 g/mol. When the molecular weight of the reducing agent is different from an appropriate range (e.g., 100 to 200 g/mol), the reducing agent may be thermally unstable.

The reducing agent may be included in an amount of about 0.01 to 1% by weight in the polyoxymethylene resin composition based on the total weight of the composition. When the amount of the reducing agent is less than about 0.01% by weight, formaldehyde may be excessively generated in the molded article. When the amount of the reducing agent is greater than about 1% by weight, mechanical properties may deteriorate. In an exemplary embodiment, the reducing agent may be included in an amount of about 0.05 to 0.3% by weight, or preferably about 0.15 to 0.2% by weight based on the total weight of the composition.

The molded article according to the exemplary embodiment of the present invention may be produced by molding the above-mentioned resin composition, and a generation amount of formaldehyde may be reduced in the thus produced molded article. For instance, formaldehyde may be generated in a range of about 0.1 and 10 mg/kg, about 1 and 5 mg/kg, or particularly about 2 and 3 mg/kg, as evaluated by VDA275, in the molded article.

In addition, the molded article according to the exemplary embodiment of the present invention may have excellent mechanical strength. For instance, its tensile strength may be 100 MPa or greater, or particularly in a range of about 110 to 160 MPa. Its flexural strength may be about 140 MPa or greater, or particularly in a range of about 157 to 220 MPa. Its flexural modulus may be about 4700 MPa or greater, or particularly in a range of about 4900 to 9000 MPa. Its impact strength may be about 6 $kJ/m^2$ or greater, or particularly in a range of about 6.2 to 10 $kJ/m^2$.

The molded article may be the actuator of the HVAC system.

Hereinafter, exemplary embodiments of the present invention and comparative examples will be described in detail. However, the following exemplary embodiments are for exemplary purposes only, and the scope of the present invention is not limited thereto.

EXAMPLE

As a polyester resin composition, a polyester resin composition having compositions shown in the following Table 1 below was prepared.

TABLE 1

| Classification (parts by weight) | | Exemplary embodiments | | | | | | Comparative examples | | | |
|---|---|---|---|---|---|---|---|---|---|---|---|
| | | 1 | 2 | 3 | 4 | 5 | 6 | 1 | 2 | 3 | 4 |
| POM | POM A | — | — | — | — | — | — | 90 | 90 | 90 | 75 |
| | POM B | 90 | 90 | 90 | 75 | 90 | 90 | — | — | — | — |
| | Glass fiber | 10 | 10 | 10 | 25 | 10 | 10 | 10 | 10 | 10 | 25 |
| Reducing agent | Reducing agent A | 0.05 | 0.1 | 0.15 | 0.15 | 0.4 | — | 0.15 | — | — | — |
| | Reducing agent B | — | — | — | — | — | — | — | 0.15 | — | — |
| | Reducing agent C | — | — | — | — | — | 0.15 | — | — | 0.15 | 0.15 |

1) POM A: POM with a content of terminal ends of formate of 20 umol/g-pom
2) POM B: POM with a content of terminal ends of formate of 35 umol/g-pom
3) Glass fiber: 10 μm diameter, chopped length 3.5 mm (Nippon Electric Glass Co. ECS03 T-651H)
4) Reducing agent A: (2,5-dioxo-4-imidazolidinyl) urea
5) Reducing agent B: Melamine (XINJI JIUYUAN CHEMICAL Co.)
6) Reducing agent C: Adipic dihydrazide (Otsuka Chemical Co.)

In Table 1, the content of the terminal ends of the formate was measured by preparing the POM in a form of a film, immersing it in a chloroform solution at a temperature of 100° C. for 6 hours, and then measuring an area of 1778 to 1697 $cm^{-1}$ by using FT-IR (Spectrum 2000 of Perkin Elmer Co.).

The polyester resin composition was melt-kneaded using a twin-screw extruder, and the melt from a die of the extruder was cooled through a cooling bath to prepare pellets. The prepared polyoxymethylene composition was injected using an injection machine to prepare an injection molded article.

Physical properties and generation amounts of the formaldehyde were evaluated and are shown in Table 2 below.

(1) Tensile strength was evaluated using ISO 527.
(2) Flexural strength was evaluated using ISO 178.
(3) Flexural modulus was evaluated using ISO 178.
(4) Impact strength was evaluated using ISO 179 under 1 eA condition.
(5) Generation amount of formaldehyde: On the day after being molded, the generation amount of the formaldehyde of VOCs was tested according to German Automobile Manufacturers Association Standard VDA275 (Determination of Formaldehyde Levy—Measuring Techniques after the Modified Bottle Method). Specifically, it was evaluated through the following processes.

(i) 50 ml of distilled water was poured into a polyethylene container, a lid thereof was closed while a test piece was hung in the air, and then it was heated at a temperature of 60° C. for 3 hours in an airtight state.

(ii) After leaving it alone at room temperature for 60 minutes, the test piece was taken out.

(iii) An amount of formaldehyde absorbed in the distilled water in the polyethylene container was preliminarily measured with a UV spectrometer using an acetyl acetone colorimetric method and measured with an ultraviolet spectrometer. (Acetyl acetone colorimetric method: Formaldehyde reacts with ammonium ions and acetylacetone to form 2,5-diacety-1,4-dihydrolutidin (DDL), and the DDL is a material with a maximum absorption wavelength at 412 nm of UV.)

mechanical properties were somewhat poor by using the reducing agent in an excessive amount.

Among Exemplary Embodiments 1 to 6, since the compound containing hydrazine was used as the reducing agent in Exemplary Embodiment 6, the mechanical properties were poor.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polyoxymethylene resin composition, comprising:
a filler in an amount of about 5 to 30 wt %,
a formaldehyde reducing agent in an amount of about 0.01 to 1 wt %, and
a polyoxymethylene resin,
all the wt % based on the total weight of the polyoxymethylene resin composition,
wherein per 1 g of the polyoxymethylene resin comprises an amount of about 30 to 40 μmol of formate.

2. The polyoxymethylene resin composition of claim 1 comprising the polyoxymethylene resin constituting the remaining balance of the polyoxymethylene resin composition.

3. The polyoxymethylene resin composition of claim 1, wherein the filler comprises at least one of a fiber type, a particle type, a plate type, and a needle type of filler.

4. The polyoxymethylene resin composition of claim 1, wherein the filler comprises a fiber type of filler having an average length of about 2.5 to 4.5 mm.

TABLE 2

| Classification | Exemplary embodiments | | | | | | Comparative examples | | | |
|---|---|---|---|---|---|---|---|---|---|---|
| | 1 | 2 | 3 | 4 | 5 | 6 | 1 | 2 | 3 | 4 |
| Tensile strength (MPa) | 111 | 110 | 110 | 157 | 106 | 103 | 107 | 109 | 101 | 145 |
| Flexural strength (MPa) | 159 | 158 | 158 | 218 | 149 | 144 | 151 | 155 | 141 | 207 |
| Flexural modulus (MPa) | 4930 | 4928 | 4931 | 8515 | 4775 | 4710 | 4788 | 4840 | 4655 | 8176 |
| Impact strength (kJ/m$^2$) | 6.3 | 6.4 | 6.3 | 9.9 | 6.1 | 5.7 | 6.1 | 6.3 | 5.5 | 7.8 |
| Formaldehyde generation amount (mg/kg) | 8.9 | 4.9 | 2.2 | 2.2 | 2.2 | 4.0 | 2.4 | 12.8 | 4.6 | 4.1 |

As shown in Table 2, Exemplary Embodiments 1 to 6 were superior in both mechanical strength and formaldehyde generation amount as compared with Comparative Examples 1 to 4.

Further, the flexural modulus of Comparative Examples 1 and 3 were less than those of the Exemplary Embodiments. The tensile strength, the flexural strength, and the impact strength of the comparative examples were also substantially less than those of the Exemplary Embodiments. In addition, the formaldehyde generation amount of Comparative Example 2 was substantially increased to that of the Exemplary Embodiments.

The mechanical strength of Comparative Example 4 was worse than that of Exemplary Embodiment 4 in which glass fibers of the same weight were added.

Among Exemplary Embodiments 1 to 6, Exemplary Embodiments 3 to 5, in which a large amount of the reducing agent was added, were excellent in the formaldehyde generation amount. However, in Exemplary Embodiment 5, its 5. The polyoxymethylene resin composition of claim 1, wherein the filler comprises at least one of an inorganic fiber and an organic fiber.

6. The polyoxymethylene resin composition of claim 1, wherein the filler comprise a glass fiber.

7. The polyoxymethylene resin composition of claim 1, wherein the reducing agent is included in an amount of about 0.05 to 0.3% by weight based on the total weight of the polyoxymethylene resin composition.

8. The polyoxymethylene resin composition of claim 1, wherein the reducing agent comprises at least one of urea, melamine, and hydrazine, which are optionally substituted.

9. The polyoxymethylene resin composition of claim 1, wherein the reducing agent comprises at least one of urea substituted with an imidazole group and urea substituted with a diazo group.

10. The polyoxymethylene resin composition of claim 1, wherein an average molecular weight of the reducing agent is in a range of about 100 to 200 g/mol.

11. The polyoxymethylene resin composition of claim 1, wherein the reducing agent comprises at least one of 2,5-dioxo-4-imidazolidinyl urea and diazolidinyl urea.

12. A molded article manufactured with a polyoxymethylene resin composition of claim 1.

13. The molded article of claim 12, wherein the molded article is an actuator of an HVAC system.

* * * * *